Nov. 6, 1951 T. N. BJORNDAHL 2,574,010
SHAKER TABLE FOR COMBINES OR THRESHERS
Filed March 23, 1949
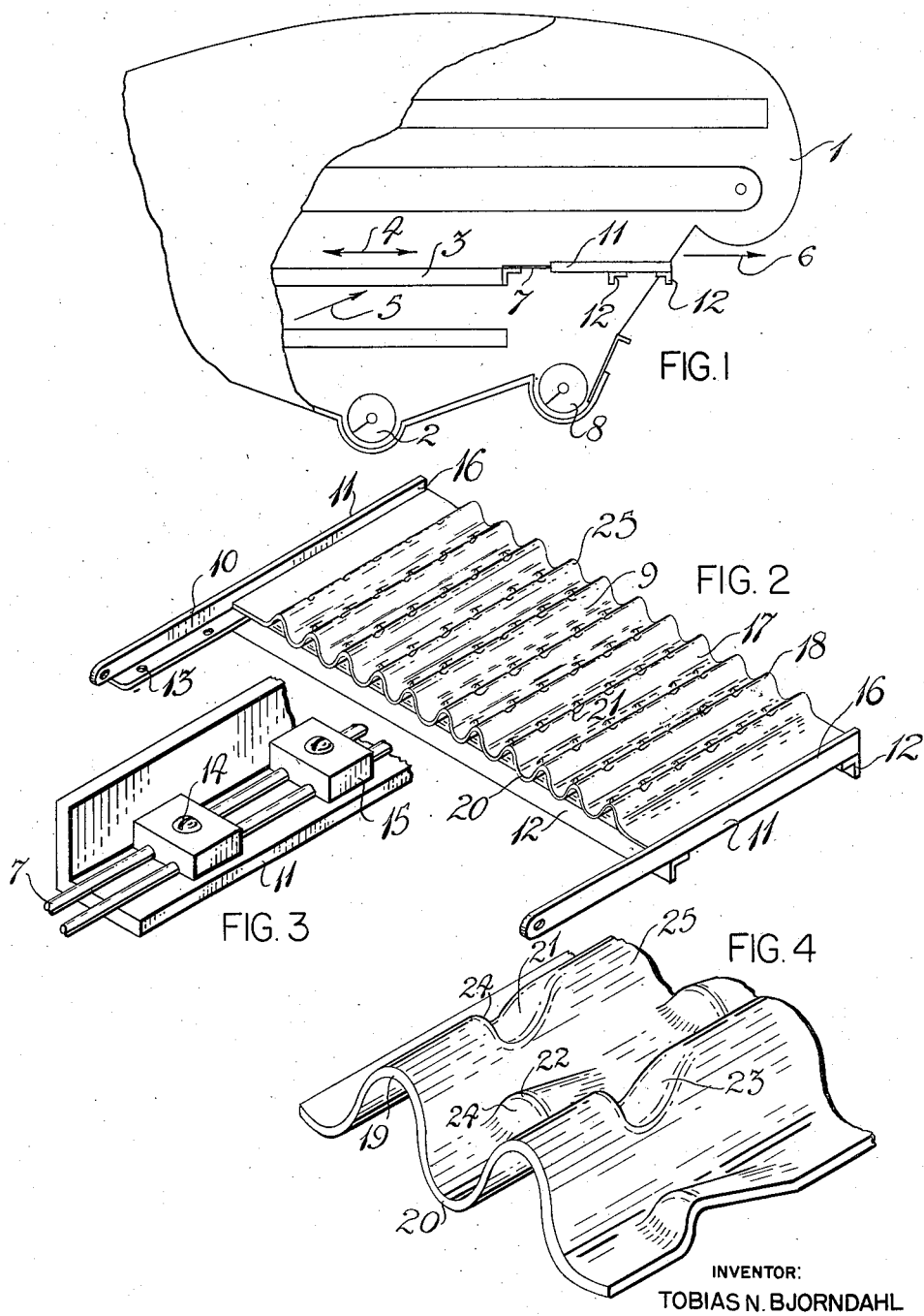
INVENTOR:
TOBIAS N. BJORNDAHL
HIS ATTY'S Patented Nov. 6, 1951

2,574,010

UNITED STATES PATENT OFFICE 2,574,010

SHAKER TABLE FOR COMBINES OR THRESHERS

Tobias N. Bjorndahl, Watrous, Saskatchewan, Canada

Application March 23, 1949, Serial No. 82,929

1 Claim. (Cl. 130—24)

My invention relates to new and useful improvements in shaker tables for combines or threshers suitable for use with threshing machines, combines and the like, an object of my invention being to provide a device of the character herewithin described whereby a proportion of the grain carried by the air stream beyond the limits of the conventional screens may be retrieved and returned to the tailing auger.

A further object of my invention is to provide a device of the character herewithin described which as well as retrieving grain carried by the air stream also ejects chaff and weeds rearwardly from the machine.

A still further object of my invention is to provide a device of the character herewithin described which is readily adaptable for use with any grain separating machine incorporating an oscillating screen or chaffer.

Another object of my invention is to provide a device of the character herewithin described which is economical in manufacture, simple in construction, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a fragmentary side elevation of a conventional combine harvester sectioned in part to show my device in situ.

Figure 2 is a perspective view of my device per se.

Figure 3 is an enlarged fragmentary perspective view showing the method of attachment of my device to a combine harvester.

Figure 4 is an enlarged perspective fragmentary view of my corrugated plate showing the formation of the recesses and projections thereon.

In the drawings like characters of reference indicate corresponding parts in the different figures.

The conventional method of separating grain kernels in a combine harvester or the like includes among other things at least one reciprocating screen or chaffer having a stream of air passing upwardly and rearwardly therethrough. This permits the grain kernels to be deposited by gravity into one or more augers while the chaff or straw is blown rearwardly from the machine by the aforementioned stream of air.

Under normal circumstances a proportion of the grain kernels are carried rearwardly with the air stream due to excessive vibration or unevenness of ground as well as a relatively high air speed developed in order to keep the screens clear of green weeds or the like. The present invention is designed to assist in the recovery of these grain kernels and at the same time to carry out separation from chaff or straw which may be intermingled therewith.

Proceeding now to describe my invention in detail, it will be seen upon reference to the accompanying drawings that I have illustrated in fragmentary form in Figure 1 a side elevation of the rear of a conventional combine. This includes a main auger 2 subjacent a conventional tailing chaffer 3 which is reciprocated or oscillated in the directions of the double-headed arrow 4. A stream of air developed by a conventional blower (not illustrated) passes upwardly and rearwardly substantially in the direction of arrow 5 carrying with it chaff and grain kernels which exit at the rear of the machine along a path indicated substantially by arrow 6. A plurality of rearwardly extending wires 7 are connected to the rear of the tailing chaffer 3 and permit grain kernels to pass therethrough to the tailing auger 8 wherefrom they are deposited in the combine hopper. The wires 7 are sufficiently close together to prevent weeds, straw or the like from passing therebetween and it will be appreciated that only a small proportion of the kernels carried by the air stream will pass downwardly through these wires.

Consequently I have provided a retrieving screen collectively designated 9 which in this embodiment is adapted to be secured to the extremities of the aforementioned wires 7 and reciprocate or oscillate therewith as will hereinafter be described. The screen 9 consists of a frame 10 comprising a pair of longitudinal angle iron members 11 held in parallel spaced relationship by means of the transverse stringers 12 as clearly shown in Figure 2. The forward ends of the components 11 are drilled as at 13 to receive bolts 14 which secure bridges 15 thereto. These bridges span or straddle the outboard pair of wires 7 as clearly shown in Figure 3 thereby forming a means of attachment of the screen 9 to the tailing chaffer 3.

The rear portions 16 of the components 11 are spanned by a corrugated plate 17 secured thereto as by welding or the like and having the corrugations 18 running parallel to the longitudinal axis of the machine or in other words in the direction of oscillation of the tailing chaffer 3.

The corrugations 18 are comprised of ridges 19 and valleys 20, so defined as viewed in situ from above, the former being apically abated or impressed downwardly and the latter being apically embossed upwardly so as to form what I define as inclining recesses 21 and projections 22 respectively at spaced intervals along the length thereof.

Reference to Figure 4 of the accompanying drawings will show that recesses 21 and projections 22 have substantially what I define as nasal contouration and nasal configuration respectively, and include the flanking surfaces 23 and the vestibular surfaces 24 (the latter being the anatomical definition of the surface of nostril openings).

It will be seen that the flanking surfaces 23 of the recesses 21 incline upwardly and away from the vestibular surfaces 24 towards the rear ends 25 of the ridges 19 and that the flanking surfaces of the projections 22 incline downwardly and away from the vestibular surfaces thereof towards the rear ends of the ridges. By this novel configuration it will be noted that the vestibular surfaces of the recesses 21 and the projections 24 are in what I define as actional opposition. By this I mean that if each individual ridge and recess is treated as a ratchetted length then the aforementioned vestibular surfaces 24 will be acting in opposite directions from one another In operation the tailing chaffer reciprocates or oscillates in the directions shown by the double-headed arrow 4 carrying with it the retrieving screen 9. A proportion of grain, chaff, straw and the like will be deposited upon the oscillating retrieving screen with the result that the grain kernels will gravitate into the valleys 20 of the corrugations. The straw and chaff will tend to bridge the ridges 19 thereby causing separation. Oscillation of the screen 9 with the tailing chaffer 4 will cause the grain kernels to be urged forwardly by means of the ratchet action of the aforementioned projections 22 until they drop between the wires 7 into the tailing auger 8. The straw and chaff on the other hand will be urged rearwardly by means of the recesses 21 within the ridges 19 and will be deposited rearwardly of the combine well clear of the tailing auger 8.

From the foregoing it will be seen that a proportion of grain kernels will be salvaged or retrieved which otherwise would be broadcast upon the field by means of the stream of air passing through the tailing chaffer.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A grain retrieving screen for threshing machines, combines and the like comprising in combination a frame, means for securing said frame in spaced relationship to a reciprocating tailing chaffer for oscillation therewith, and a corrugated plate spanning said frame, said corrugations lying in the direction of oscillation, the ridges and valleys of said corrugations being apically abated and embossed respectively at spaced intervals, to provide recesses of substantially nasal contour and projections of substantially nasal configuration having vestibular and flanking surfaces, said vestibular surfaces lying in actional opposition, the flanking surfaces of said recesses inclining upwardly and away from the vestibular surfaces thereof, and towards the rear end of said ridges and the flanking surfaces of said projections inclining downwardly away from their vestibular surfaces towards the rear ends of said valleys, and a parallel wire screen extending between the chaffer and the corrugated plate to receive the grain from the plate and transmit motion from the chaffer to the plate.

TOBIAS N. BJORNDAHL.

REFERENCES CITED

The following references are of record in the file of this patent:

UNITED STATES PATENTS

| Number | Name | Date |
|--------|------|------|
| 213,156 | Allonas | Mar. 11, 1879 |
| 1,478,960 | Hoffman | Dec. 25, 1923 |

FOREIGN PATENTS

| Number | Country | Date |
|--------|---------|------|
| 4,979 | Sweden | 1893 |
| 250,846 | Germany | Sept. 25, 1910 |
| 295,232 | Germany | Nov. 13, 1916 |